United States Patent

Adler

[15] 3,696,313

[45] Oct. 3, 1972

[54] ARRANGEMENT FOR CONVERTING BETWEEN ACOUSTIC COMPRESSIONAL WAVES AND SURFACE WAVES

[72] Inventor: Robert Adler, Northfield, Ill.

[73] Assignee: Zenith Radio Corporation, Chicago, Ill.

[22] Filed: July 29, 1970

[21] Appl. No.: 59,216

[52] U.S. Cl. ....................333/30 R, 333/72, 310/9.8, 259/1 R

[51] Int. Cl. ........H03h 9/00, H04r 17/00, H03h 7/36

[58] Field of Search ............333/30, 72; 310/9.7, 9.8; 259/1 R, DIG. 44

[56] References Cited

UNITED STATES PATENTS

| | | | |
|---|---|---|---|
| 3,300,739 | 1/1967 | Mortley | 333/30 |
| 3,401,360 | 10/1968 | Schulz-Dubois | 333/30 |
| 3,387,235 | 6/1968 | Fair | 333/30 |
| 2,169,304 | 8/1939 | Tournier | 333/72 |
| 2,408,436 | 10/1946 | Mason | 333/30 |
| 3,522,557 | 8/1970 | Duncan et al. | 333/30 |
| 3,070,761 | 12/1962 | Rankin | 333/30 |
| 3,488,607 | 1/1970 | Bongiani | 333/30 |
| 3,388,334 | 6/1968 | Adler | 330/5.5 |
| 3,289,114 | 11/1966 | Rowen | 333/30 |
| 3,283,264 | 11/1966 | Papadakis | 333/72 |

*Primary Examiner*—Herman Karl Saalbach
*Assistant Examiner*—Marvin Nussbaum
*Attorney*—John J. Pederson and Peter J. Sgarbossa

[57] ABSTRACT

One or more conversion devices effect conversion between compressional waves and surface waves. In one form, surface waves created by an applied input signal are converted to compressional waves having an exponential amplitude taper across their path and those compressional waves, in turn, develop surface waves from which an output signal is derived. In another form wherein compressional waves create surface waves at a common boundary, the compressional waves exhibit an at least approximate exponential amplitude taper across their path. In yet another form, compressional waves create surface waves at a common boundary the length of which is such that, in traveling along the boundary in the reverse direction, the surface waves would be attenuated by a value of $1/e$. These conversion devices are reversible and typically the surface-wave medium is a solid while the compressional-wave medium is a liquid, semi-liquid or plastic.

5 Claims, 7 Drawing Figures

Inventor
Robert Adler
By Francis W. Crotty
Attorney

Inventor
Robert Adler
By Francis W. Crotty
Attorney

ARRANGEMENT FOR CONVERTING BETWEEN ACOUSTIC COMPRESSIONAL WAVES AND SURFACE WAVES

BACKGROUND OF THE INVENTION

The present invention pertains to acoustic conversion devices. More particularly, it relates to such devices for converting between compressional waves and surface waves.

It has long been known to use a compression-wave propagating wedge for the purpose of generating and recovering surface wave energy. However, such prior approaches have been generally known to be inefficient, a typical technique encountering a loss of about 50 db for a double conversion process. It has also been known that when surface waves travel along a solid immersed in a liquid, they are attenuated exponentially and their energy content is dissipated in the form of compressional waves in the liquid. This information, however has not yet led to practical utilization in a system.

It is, accordingly, one general object of the present invention to provide new and improved acoustic conversion devices which are capable of exhibiting substantially increased efficiency in converting between compressional waves and surface waves.

Another object of the present invention is to provide new and improved acoustic conversion devices which enable simple modification of previously-known wedge transducers in order to substantially minimize losses in converting between compressional and surface waves.

SUMMARY OF THE INVENTION

An acoustic conversion system constructed in accordance with the present invention converts between compressional waves and surface waves. A first medium in the system propagates the surface waves along a surface thereof. Forming a common boundary with that medium is a second medium that propagates the compressional waves along a particular direction with respect to the surface. Along the common boundary the compressional waves exhibit a predetermined, approximately exponential amplitude taper across their path. Finally, the system includes transducer means coupled to the second medium matched to efficiently generate or absorb compressional waves which are characterized by the aforesaid amplitude taper and which travel along the aforesaid particular direction.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

DESCRIPTION OF THE PREFERRED EMBODIMENT

Figure 1:
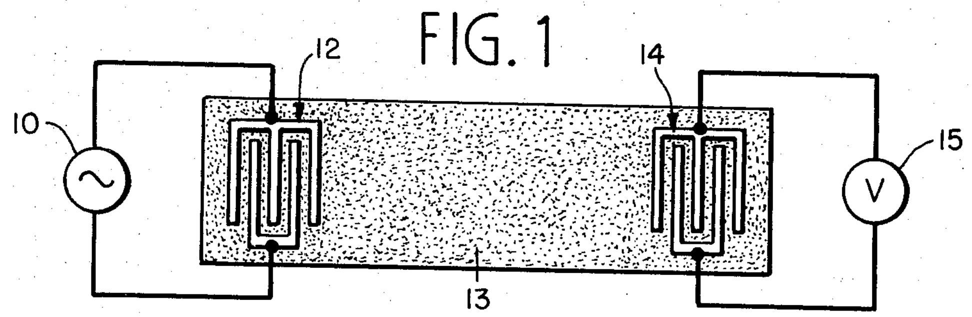
FIG. 1 is a diagrammatic view of a known surface wave filter.

For the purpose of explaining the basic nature of and principles involved in the operation of surface wave devices, FIG. 1 illustrates one form of surface wave integratable filter of a kind described in detail, and with various modifications and alternatives, in copending application Ser. No. 721,038 filed Apr. 12, 1968 by Adrian DeVries and assigned to the same assignee as the present aPplication now U.S. Pat. No. 3,582,838. A signal source 10 is connected across an input transducer 12 mechanically coupled to one major surface of a body of piezoelectric material or substrate 13 which serves as an acoustic-surface-wave propagating medium. An output or second portion of the same surface of substrate 13 is, in turn, mechanically coupled to an output transducer 14 across which a load 15 is coupled.

Transducers 12 and 14 in this simplest arrangement are identical and are individually constructed of two comb-type electrode arrays. The conductive teeth of one comb are interleaved with the teeth of the other. The combs are of a material, much as gold or aluminum, which may be vacuum deposited on a smoothly lapped and polished planar surface of the piezoelectric body. The piezoelectric material is one, such as PZT, quartz or lithium niobate, that propagates acoustic surface waves. The distance between the centers of two consecutive teeth in each array is one-half of the acoustic wavelength in the piezoelectric material of the signal wave for which it is desired to achieve maximum response.

The overall operation of the system of FIG. 1 is now well-known. Electrical signals applied from source 10 to transducer 12 are converted into surface waves which, after traveling across the surface of substrate 13, are transduced back into electrical signals by device 14. The arrangement of FIG. 2 features initial and final transducing actions that are similar to the system of FIG. 1 but intermediate those transducing actions the surface waves are first converted into compressional waves and then back into surface waves. To this end, the apparatus of FIG. 2 includes a container 20 filled with a liquid 21 which in this case is water. Partially immersed into liquid 21 toward one end of container 20 is a slab 22 of piezoelectric material. Slab 22 is canted so that its upper surface 23 forms an angle $\phi$ with the free surface 24 of the liquid. Disposed on the portion of surface 23 held above surface 24 is a surface wave transducer 25, in this case formed of a pair of interleaved combs of electrodes in the manner of transducer 12 in FIG. 1. Coupled across those combs is an input signal source 26.

Similarly disposed toward the opposite end portion of container 20 is another slab 28 of piezoelectric material also immersed in liquid 21 so that its upper surface 29 again forms the angle $\phi$ with liquid surface 24. Disposed on the end portion of surface 29 supported above the liquid surface is a surface-wave transducer 30 also formed of a pair of interleaved electrode combs in the manner of transducer 14 of FIG. 1. Coupled across those combs is a load 31 which for purposes of illustration may simply be a voltmeter that permits measurement of the potential developed by transducer 30.

In operation, a signal from source 26 applied to transducer 25 causes surface waves to be launched along surface 23. The velocity $v_s$ of those waves as they travel along the boundary between surface 23 and liquid 21 remains very close to that of the waves on surface 23 prior to entering the liquid. As the surface waves traveling along the surface enter the liquid, they are attenuated with a decay constant that is a function of the mechanical properties of the two mediums; generally the attenuation is determined by the ratio of the acoustic impedance of slab 22 to that of liquid 21. The energy lost by the surface waves is converted into compressional waves in liquid 21. Thus, surface waves traveling along the boundary defined by surface 23, and indicated by the arrow $S_t$, are converted into compressional waves indicated by the arrow $p$. The compressional waves are radiated from surface 23 at an angle $\phi$ which satisfies the relationship:

$$\cos \phi = V_o / V_s ,$$

where $v_o$ is the compressional wave velocity in liquid 21 and $v_s$ is the surface wave velocity. For optimum conditions of energy transfer, it is desired that the compressional waves be propagated in a direction parallel to the free surface 24 of the liquid. This requires the wedge angle between surfaces 23 and 24 to be equal to $\phi$ a determined above.

Within liquid 21, the compressional waves exhibit an exponential amplitude taper along their wavefronts in the direction $y$ of increasing depth below the level of surface 24. This is indicated by the small plot immediately above surface 24 in FIG. 2. A surface wave of amplitude S in liquid 21 along surface 23 may be represented by the expression $$S = S_o e^{-\alpha s},$$

where $S_o$ is the surface wave amplitude upon entering the liquid, $\alpha$ is the attenuation constant of the surface wave within the liquid along surface 23 and $s$ is the distance traveled along surface 23 below liquid surface 24. The resulting compressional wave exhibits an amplitude taper along its wavefronts defined by the equation $$p = p_o^{-\beta y},$$

where $p_o$ is the compressional wave amplitude at surface 24 and $\beta$ is the transverse attenuation constant or amplitude taper of the compressional wave in liquid 21. There exists a direct relationship between the attenuation constants and the angle $\phi$:

$$\sin \phi = \alpha / \beta .$$

The relationship between $p_o$ and $S_o$ is determined by the mechanical constants of substrate 22 and liquid 21. It is to be noted that the constant $\beta$ which determines the amplitude taper of the compressional wave also depends only on the mechanical properties of the materials 21 and 22 and on the wavelength, i.e. the frequency of the applied signal.

The process just described is completely reversible. That is, where the direction of propagation of the exponentially tapered compressional waves to be reversed, as would be indicated by a reversal in the direction of arrow $p$ in FIG. 2, the compressional waves upon reaching the boundary defined by substrate surface 23 would be converted to surface waves propagating upward along surface 23 as would be indicated by a reversal of direction of arrow $S_t$.

Figure 2:
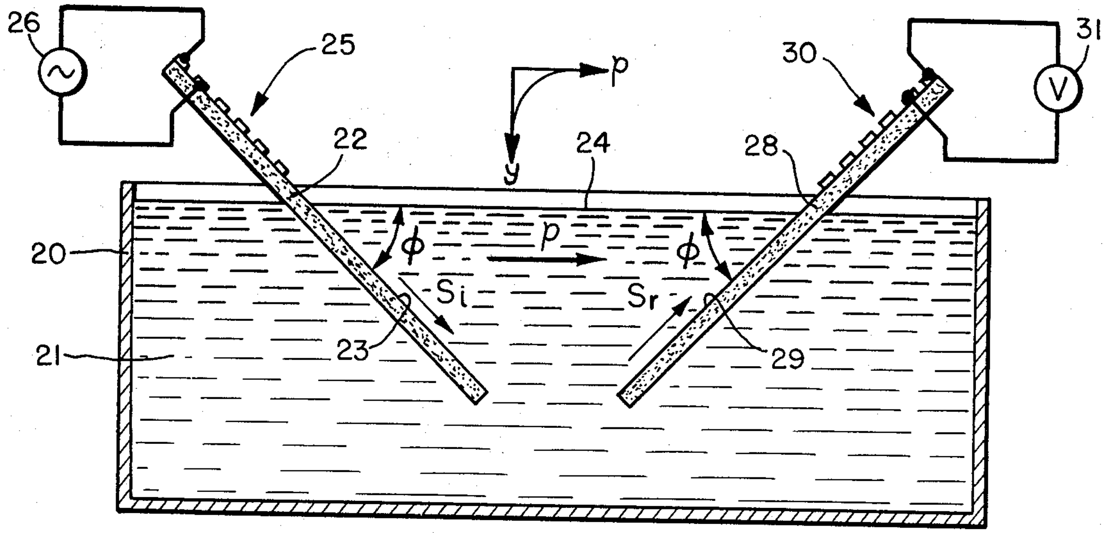
FIG. 2 is a cross-sectional view of a transducer arrangement for converting between surface waves and compressional waves.

As actually shown in FIG. 2, substrate 28 is disposed to receive exponentially tapered compressional waves $p$, as a result of which surface waves are developed that propagate upwardly along surface 29 as indicated by the arrow $S_r$. Those surface waves interact with output transducer 30 and develop electric signals to which load or voltmeter 31 responds. For obtaining optimum efficiency of conversion, substrate 28 is canted at the same angle $\phi$ with reference to the direction p of the incoming compressional waves (assuming that substrate 28 exhibits the same surface wave velocity as substrate 22).

Figure 3:
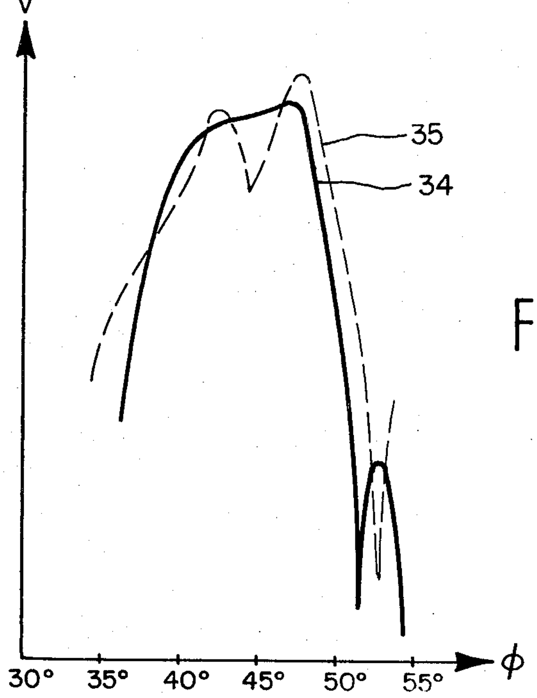
FIG. 3 is a plot of response curves obtained with apparatus constructed in accordance with FIG. 2.

FIG. 3 illustrates response curves for the signal transmission path from input signal source 26 to voltmeter 31 as the wedge angles $\phi$ pertaining to both substrates 22 and 28 are uniformly varied. Curves 34 and 35 both are obtained with apparatus essentially like that shown in FIG. 2. The detailed differences between the two curves represent irregularities in the meniscus at the point of contact between liquid 24 and surface 23. For the apparatus which exhibits curves 34 and 35, liquid 21 was water exhibiting a compressional wave velocity of 1,480 meters per second, and slabs 22 and 28 were PZT exhibiting a surface wave velocity of 2,170 meters per second. As compared with a predicted angle $\phi$ of 47° based upon the ratio of velocities, it will be observed that the measured point of highest efficiency is approximately at that value while the midpoint of what might be termed the high-efficiency region is at about 43°.

With an arrangement as in FIG. 2, having transducers 25 and 30 selected to interact with signals from source 26 exhibiting a frequency of 6.8 megahertz, the effective length of the compressional wave path in liquid 21 was approximately 4.5 centimeters. After accounting for known losses in transducers 25 and 30 themselves, it was found that the insertion loss of the arrangement itself was approximately 8 db. This is sharply lower than previously known wedge-action wave conversion systems. In a modified arrangement in which the operating frequency was 10.4 megahertz, the compressional wave path length was 0.5 centimeters and the conversion-system insertion loss was only 6 db. Those small residual losses include transmission and attenuation within liquid 21 as well as diffraction of the waves within liquid 21 and along the surfaces 23 and 29.

Figures 4, 5:
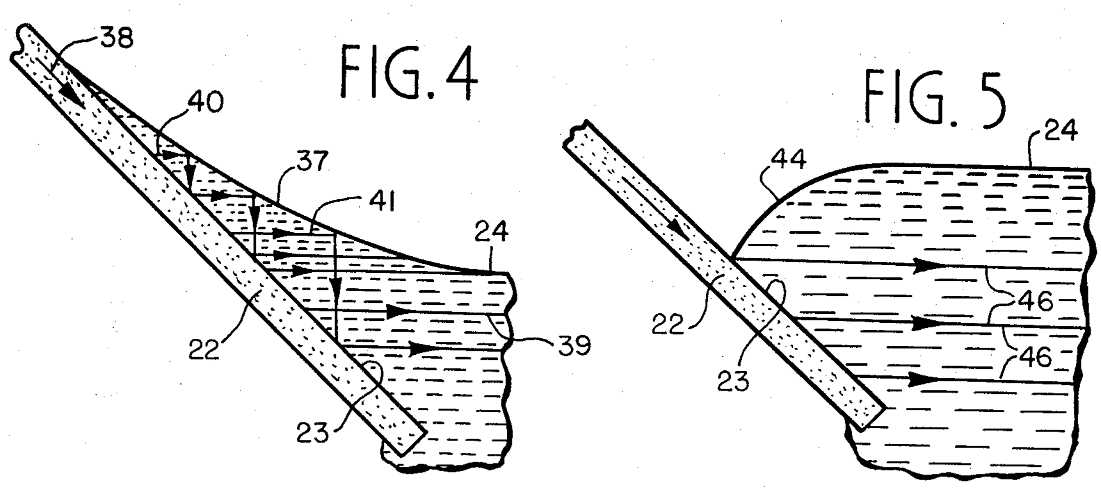
FIG. 4 is a fragmentary cross-sectional view illustrating one condition which may be present in the apparatus of FIG. 2.
FIG. 5 is a fragmentary cross-sectional view illustrating a condition reverse to that shown in FIG. 4.

It was mentioned above that the minor irregularities between curves 34 and 35 in FIG. 3 arose from meniscus variations. The reason for this is illustrated in FIG. 4 wherein liquid surface 24 has an up-turned meniscus 37 at the surface 23 of substrate 22. This occurs if liquid 21 wets substrate 22. Consequently, it will be observed that incoming surface waves represented by arrow 38 not only cause desired compressional waves as represented by arrow 39 but also cause unpredictable multiply-reflected waves as represented by arrows 40 and 41. To overcome this difficulty and thus obtain greater predictability of result, liquid surface 24 should have down-turned meniscus 44 as shown in FIG. 5 as occurs when the liquid does not wet the substrate. In such a case, multiple reflections between the meniscus and surface 23 of substrate 22 are precluded. Consequently, incoming surface waves represented by arrow 45 produce only directly radiated compressional waves as represented by arrows 46. It is possible to utilize compressional waves for the purpose of producing surface waves very efficiently in a wide variety of materials. That is, liquid 21 may be replaced by a solid such as a plastic or a semi-liquid which is here meant to be a substance such as gelatin which can only support compressional waves. In the case where liquid 21 is replaced by a solid, such as plastic, the arrangement of FIG. 2 becomes more recognizable as being within the family of the wedge transducers mentioned in the introduction. Whatever the materials, surface waves propagating along the common boundary of the wedge transducer and the surface along which the surface waves propagate exchange energy with compressional waves in the wedge. This energy exchange or wave conversion is attainable regardless of the particular materials selected upon satisfying the condition that the surface wave velocity $v_s$ along the boundary exceeds the compressional wave velocity in the medium that propagates the compressional waves. Generally, the conversion from compressional waves to surface waves is not efficient, but an appropriate exponential amplitude taper in the compressional waves, such as is inherently produced by the apparatus of FIG. 2, yields highly efficient conversion to surface waves, for instance, as output surface waves when slab 28 of the arrangement of FIG. 2 is appropriately oriented.

Figure 6:
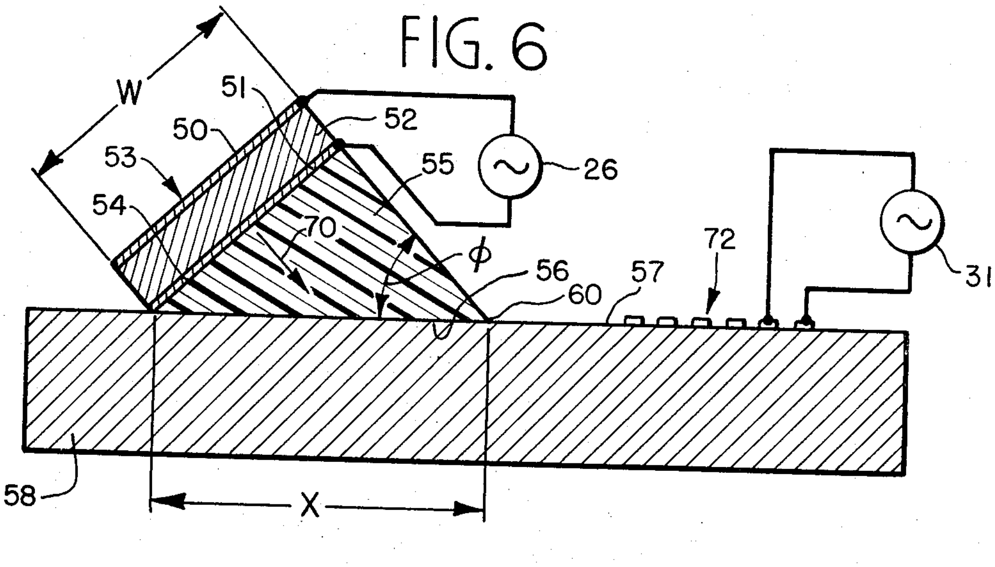
FIG. 6 is a partly-schematic cross-sectional view of an alternative system for converting between compressional and surface waves.
Figure 7:
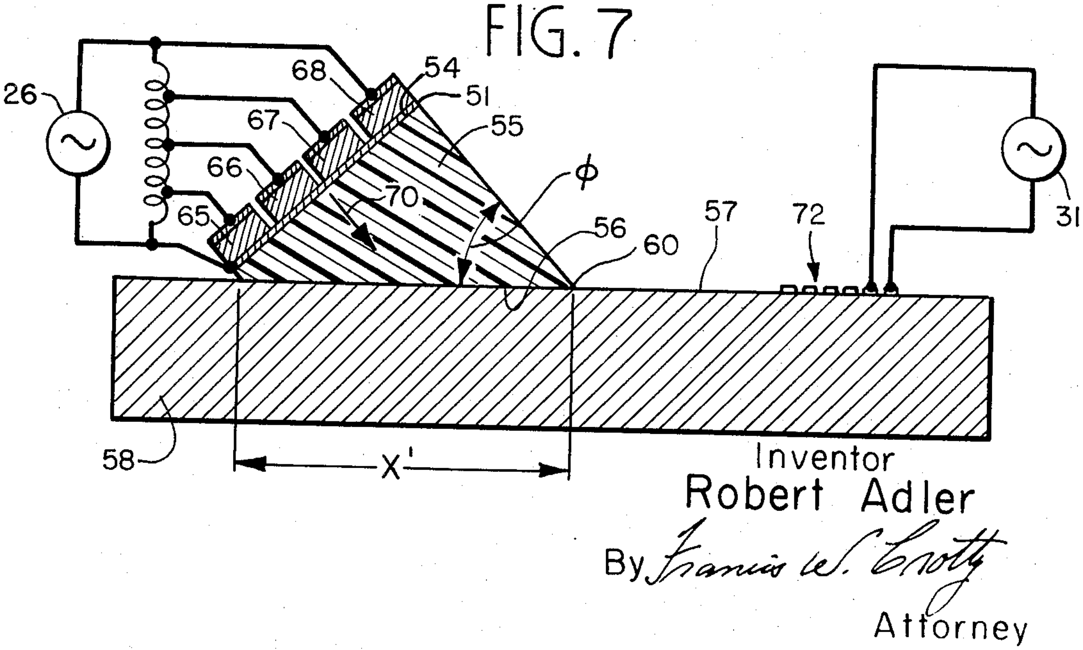
FIG. 7 is a partly-schematic cross-sectional view of a modified form of the system shown in FIG. 6.

FIGS. 6 and 7 embody the aforementioned principles in a manner usually more convenient of application than is the case when actually using a true liquid for propagating compressional waves.

In order to obtain a good approximation of the desired compressional-wave-amplitude taper, the system is modified as indicated in FIG. 7 to include a plurality of individually separate piezoelectric transducers 65, 66, 67 and 68 disposed successively across surface 54 of a wedge shaped body 55 of a plastic, such as polytetrafluorethylene, which is propagative of compressional waves. Transducers 65–68 are sandwiched between a common electrode 51 and other electrodes coupled respectively across successively larger portions of a voltage divider or radio-frequency transformer between the ends of which source 26 is connected. Another surface 56 of body 55 abuts the upper surface 57 of a substrate 58 in this case composed of a piezoelectric material. Surface 56 thus defines a common boundary with substrate surface 57. Spaced from that common boundary on surface 57 is an output transducer 72 which again in this case is composed of a pair of interleaved conductive combs across which load or voltmeter 31 is coupled.

In operation, signal source 26 drives transducers 65–68 with signals of unequal strengths but of such relative strength as to develop amplitude tapered compressional waves throughout the width of body 55. Upon initiation of the signal from source 26, the first surface waves are developed toward the left side of the common boundary as shown in FIG. 7, because that represents the shortest distance of compressional wave travel from transducer 65 to the boundary. As that initially developed surface wave component travels along the boundary in the direction toward output transducer 72, it is continually reinforced by compressional wave components of increasing amplitude that intersect the boundary further along its length. Consequently, the surface wave amplitude along the length of the boundary increases approximately exponentially in the direction from the left boundary end to the right toward transducer 72. If the amplitude taper of the signals driving transducer elements 65–68 has been chosen to correspond to the constant $\beta$ for the given frequency and combination of materials, energy transfer between elements 65–68 and the surface wave is highly efficient.

In FIG. 6, input signal source 26 is coupled across a single pair of electrodes 50 and 51 between which is sandwiched a piezoelectric element 52 so as to function as a compressional-wave input transducer 53. In FIG. 6 there is no actual taper of the amplitude of the compressional waves in the direction transverse to their path in body 55 and, therefore, the system does not achieve the advantage in conversion efficiency attainable through such a taper. However, a similar result, that is to say, much improved conversion efficiency over prior structures is realized by selecting a specific length X for the common boundary defined by surface 56. Length X is chosen to have a value $X = 1/\alpha$ so that, in traveling along surface 56 in the reverse direction, the surface waves would be attenuated to a value of $1/e$ of their amplitude at what then would be the leading edge 60 of the boundary. Correspondingly, the width $w$ of the compressional wavefronts is $1/\beta$ or, from the geometry, $w = x \sin \phi$. As in the case of FIG. 2, $\sin \phi = \alpha/\beta$. With the boundary length X selected as indicated, even though a uniform compressional wave is generated by the single transducer element 53, the arrangement provides the best possible approximation of the ideal taper attainable with the single transducer element coupled to wedge 55 and surprisingly high conversion of compressional wave energy to surface wave energy is achieved. Using polytetrafluoroethylene for the material of body 55, the compressional wave velocity is 1,275 meters per second. With substrate 58 formed of PZT exhibiting a surface wave velocity of 2,200 meters per second and operating at a signal frequency of 4.5 megahertz, the necessary length of the boundary defined by surface 56, in order to obtain the $1/e$ taper of the reverse surface wave amplitude, is only four surface wavelengths. In practice, this means a length X of but 2 millimeters, many times shorter than conventional wedge transducers for this relatively low frequency.

In utilizing a plastic such as polytetrafluoroethylene for wedge-body 55 in FIGS. 6 and 7, it is particularly necessary that a good acoustic contact occur between the two different materials where they abut along surface 56. At least with standard fabrication equipment, it often is difficult to machine a sufficiently smooth surface on a polytetrafluorethylene body to obtain the desired high degree of acoustic coupling. For all these reasons, it is contemplated to use other than a true solid as the constituent of wedge body 55. More particularly, rubber-like or gelatinous materials desirably are utilized in order better to approximate the several desirable properties of the liquid medium described in connection with FIG. 2. For example, utilizing organic gelatin, an overall insertion loss of about 9 db was exhibited. The gelatin exhibits a compressional-wave velocity nearly the same as that of water and also exhibits an insertion loss of less than 0.05 db per wavelength at 4 megahertz.

Whatever the particular selected in a given application, several different basic arrangements have been disclosed that permit conversion between compressional and surface-wave energy at extremely good efficiencies. While the geometric arrangements closely resemble prior so-called wedge transducers that convert between the same two wave modes, the use of the compressional-wave transverse taper, or the unique boundary length herein disclosed to approximate such taper, permit the attainment of insertion loss levels so low as to constitute a significant improvement.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. An acoustic transducer arrangement for converting between compressional waves and surface waves comprising:
- a liquid first medium propagative of compressional waves;
- a second medium having a surface for propagating surface waves, including a first surface portion that constitutes a common boundary with said first medium and defines a predetermined angle with the direction of wave propagation in said first medium;
- means coupled to said first medium for developing therein compressional waves which have a predetermined amplitude taper across their wavefronts, comprising:
- a third medium propagative of surface waves extending partially into said liquid first medium to define a boundary surface common to said first and third media, and
- means for developing surface waves on said boundary surface of said third medium for conversion into compressional waves in said first medium;
- and means coupled to a second portion of said second medium for responding to surface waves converted from said compressional waves and propagated along said surface of said second medium.

2. An acoustic transducer arrangement for converting between compressional waves and surface waves, comprising:
- a first medium in the form of a wedge which is propagative of compressional waves;
- a second medium having a surface for propagating surface waves, including a surface portion that constitutes a common boundary with the direction of wave propagation in said first medium;
- a plurality of electro-acoustical transducers coupled in spaced relationship to a second face of said wedge, and means for energizing said plurality of transducers from a common signal source but with unequal relative signal intensities for developing in said wedge compressional waves that have a predetermined amplitude taper across their wavefronts;
- and means coupled to a portion of said second medium, other than that constituting said boundary, for responding to surface waves converted from said compressional waves and propagated along said surface of said second medium.

3. An acoustic transducer arrangement for converting between compressional waves and surface waves comprising:
- a first medium propagative of compressional waves;
- a second medium having a surface for propagating surface waves that defines a predetermined angle with the direction of wave propagation in said first medium and having a portion which constitutes a common boundary with said first medium of such length, with respect to the attenuation constant of surface waves in said second medium, that surface waves are attenuated substantially by a value $1/e$ in traversing said portion of said second medium;
- means coupled to one of said mediums for developing therein acoustic waves of one type for conversion into acoustic waves of a second type in the other of said mediums;
- and means coupled to said other medium for responding to said acoustic waves of said second type.

4. An arrangement in accordance with claim 3 in which said first medium is in the form of a wedge having one face disposed along said boundary, and in which said means for developing acoustic waves comprises a transducer coupled to another face of said wedge for developing in said wedge compressional waves having a substantially constant amplitude across their wavefronts.

5. An arrangement in accordance with claim 4 in which said other face of said wedge and said transducer have a width $w$ equal to $x \sin \phi$, where $x$ is the length of said common boundary and $\phi$ is the angle of said portion of said second medium with respect to the direction of compressional wave propagation in said first medium.

* * * * *